(12) United States Patent
Guzman

(10) Patent No.: US 9,071,671 B2
(45) Date of Patent: Jun. 30, 2015

(54) CELLULAR TELEPHONE CASING SYSTEM INCORPORATING LENS ATTACHMENTS

(71) Applicant: IZZI GADGETS, INC., Huntington Beach, CA (US)

(72) Inventor: Jayson Guzman, Huntington Beach, CA (US)

( * ) Notice: Subject to any disclaimer, the term of this patent is extended or adjusted under 35 U.S.C. 154(b) by 180 days.

(21) Appl. No.: 13/857,416

(22) Filed: Apr. 5, 2013

(65) Prior Publication Data

US 2013/0267283 A1  Oct. 10, 2013

Related U.S. Application Data

(63) Continuation-in-part of application No. 29/423,522, filed on Jun. 1, 2012, now Pat. No. Des. 707,669, and a continuation-in-part of application No. 29/423,518, filed on Jun. 1, 2012, now Pat. No. Des. 704,183.

(60) Provisional application No. 61/686,508, filed on Apr. 6, 2012.

(51) Int. Cl.
*H04M 1/02* (2006.01)
*H04M 1/04* (2006.01)
*H04N 5/225* (2006.01)

(52) U.S. Cl.
CPC .............. *H04M 1/026* (2013.01); *H04M 1/04* (2013.01); *H04N 5/2254* (2013.01)

(58) Field of Classification Search
USPC ............... 455/575.1, 556.1, 575.3, 90.3, 555; 348/373, 374, 375, 333.1, 376, 552
See application file for complete search history.

(56) References Cited

U.S. PATENT DOCUMENTS

| 6,967,790 | B2 | 11/2005 | Wei | |
|---|---|---|---|---|
| D542,785 | S | 5/2007 | Chung et al. | |
| D626,745 | S | 11/2010 | Roman | |
| 2007/0053672 | A1* | 3/2007 | Westerweck et al. | 396/79 |
| 2007/0154209 | A1 | 7/2007 | Chang | |
| 2007/0280667 | A1* | 12/2007 | Shin | 396/133 |
| 2007/0280677 | A1 | 12/2007 | Drake et al. | |
| 2009/0093274 | A1 | 4/2009 | Yamamoto | |
| 2009/0109554 | A1* | 4/2009 | Christison | 359/823 |
| 2010/0053412 | A1* | 3/2010 | Sekimoto et al. | 348/335 |
| 2010/0328525 | A1* | 12/2010 | Lee et al. | 348/374 |

FOREIGN PATENT DOCUMENTS

| CN | 201004657 Y | 12/2006 |
|---|---|---|
| CN | 201378839 Y | 4/2009 |
| CN | 202150879 U | 7/2011 |
| JP | 2009086513 A | 10/2007 |

* cited by examiner

*Primary Examiner* — Ganiyu A Hanidu
(74) *Attorney, Agent, or Firm* — David G. Duckworth; Russo & Duckworth, LLP

(57) ABSTRACT

A cellular telephone case providing improved camera capabilities is provided. The camera enhancement case includes a housing having a front wall and four sidewalls sized for receipt of a cellular telephone. The case includes one or more camera lenses positioned to align with the camera lens of a cellular telephone to provide improved camera capabilities. Preferably, the case includes a malleable sleeve positioned between the cellular telephone and housing. Also preferably, the housing includes a handle projection for being held by a person.

6 Claims, 10 Drawing Sheets

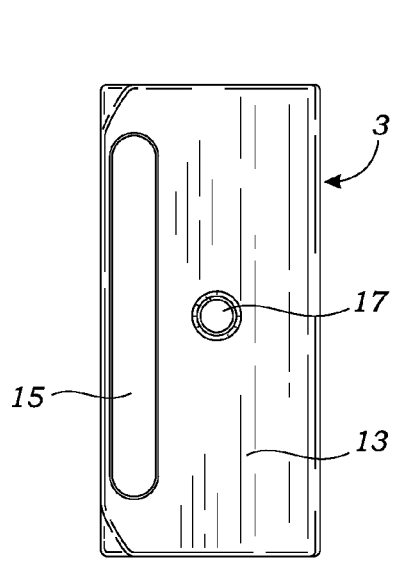
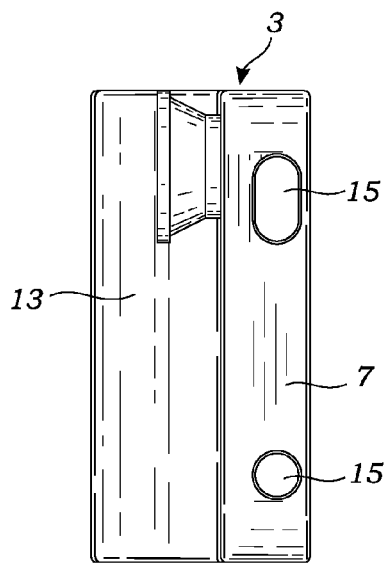
Fig. 6    Fig. 7
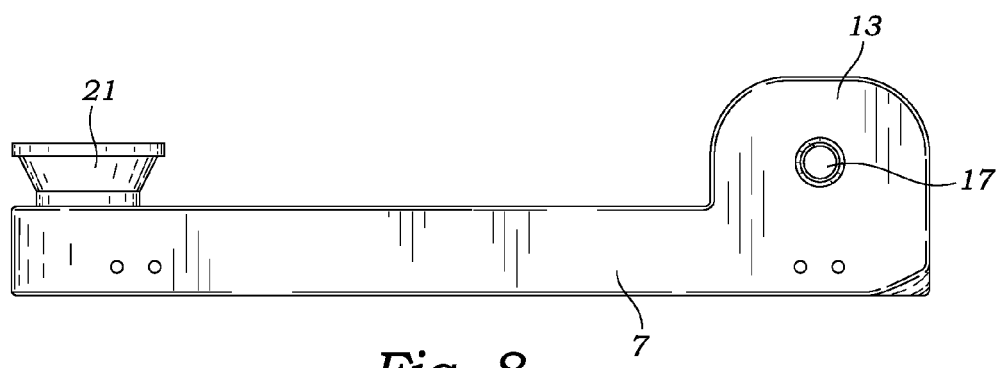
Fig. 8
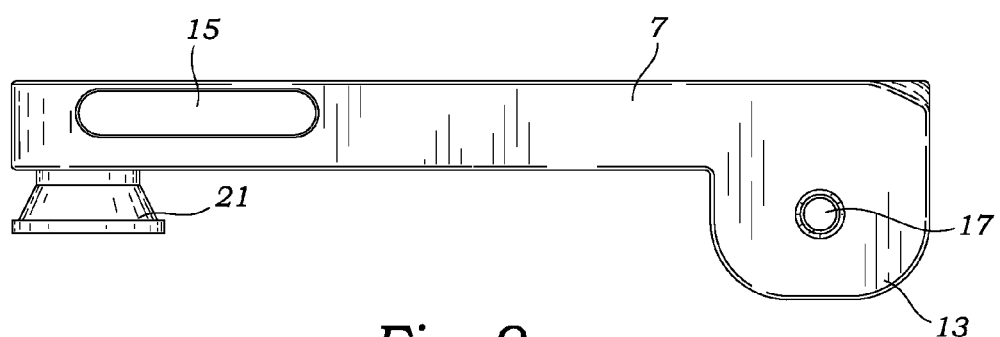
Fig. 9

CELLULAR TELEPHONE CASING SYSTEM INCORPORATING LENS ATTACHMENTS

RELATED APPLICATIONS

The present application claims priority to U.S. Provisional Application Ser. No. 61/686,508 filed on Apr. 6, 2012, and claims priority to U.S. Design patent application Ser. No. 29/423,518 filed Jun. 1, 2012 and U.S. Design patent application Ser. No. 29/423,522 filed Jun. 1, 2012.

BACKGROUND OF THE INVENTION

The present invention relates to protective cases for electronics. More specifically, the present invention relates to protective cases for electronic devices.

Electronic devices such as cellular telephones, tablet computers, media players, global positioning system receivers, and personal data assistance devices are gaining widespread usage. These devices typically include a display, commonly referred to as a screen. In addition, these devices typically include a touchpad and one or more camera lenses. The screen, touchpad and camera lens are susceptible to various types of damage including scratches, nicks, impacts and chemical exposure. Though relatively fragile, these devices are increasing in costs. Accordingly, consumers desire to protect their products from accidental damage, and accordingly, there are now a wide variety of companies selling protective cases and films to help protect electronic devices.

In particular cellular telephones are increasing in popularity, including the need to protect cellular telephones. Modern cellular telephones typically incorporate a camera. These cameras have improved in quality to the point where many consumers have discarded or do not use a separate camera. Unfortunately, cellular telephone cameras still do not provide the picture quality of a traditional camera. This poor picture quality is primarily due to the comparatively poor lens quality within a cellular telephone's camera module.

Thus, there is a need to improve the picture quality of cellular telephone cameras. There is also a need to provide added protection to cellular telephone cameras.

SUMMARY OF THE INVENTION

Generally, cellular telephones come equipped with cameras. The present invention provides a casing with lens attachments that enhance the beneficial features of the cellular telephone camera system. The present invention also provides a protective shell for the cellular telephone.

To this end, the present invention is directed to a camera enhancement case for cellular telephones and the like. The camera enhancement case includes a housing, and preferably a sleeve. The sleeve is preferably made of a soft malleable material such as rubber for protecting a cellular telephone when it is positioned within the camera enhancement case's housing. The sleeve has a central cavity sized for receipt of the cellular telephone. In addition, the sleeve has a hole positioned so that the cellular telephone's camera lens is adjacent to the hole.

The housing may be made of any material, such as plastic or metal. A preferred material is a ferrous metal. The housing has a recess formed by sidewalls and a front wall. The recess is sized for receiving the cellular telephone and sleeve. Preferably the housing also includes a projecting region forming a handle for better controlling the manual manipulation of the camera enhancement case. Preferably the handle projection has a female threaded bore at each end. Preferably, the housing also has holes for accessing any buttons or electrical connectors, such as a headphone jack or charging port, positioned along the periphery of the case.

The housing's face plate has a hole positioned in front of the cellular telephone camera lens so that the cellular telephone's camera can operate when the cellular telephone and camera enhancement case are combined. In a preferred embodiment, the face plate includes an annular recess around the camera hole for receipt of a lens. The lens may be affixed to the housing by numerous constructions known to those skilled in the art such as a press-fit or male/female threaded attachment. However, in a preferred embodiment, the lens possesses an annular magnet (not shown) or engaging the housing's annular recess. The magnetic properties of the lens' annular magnet affixes to the ferrous metal of the housing. Various lens constructions such as fisheye, wide angle and telephoto can be rapidly swapped by simply disengaging the magnetic attachment of respective lenses to the housing and swapping alternative lenses.

In a second embodiment of the camera enhancement case of the present invention, a rotating bracket assembly is affixed to the case's front wall. The rotating bracket is affixed to the front wall by a spindle allowing the rotating bracket to rotate. The rotating bracket is constructed to hold two or more lenses. A preferred rotating bracket is constructed to hold three lenses. The rotating bracket is constructed to position a lens in front of the case's camera hole with rotation of the rotating bracket allowing different lenses to be selectively positioned in front of the camera hole. The lenses may be permanently affixed to the rotating bracket. Alternatively, the lenses may be detachably affixed to the rotating bracket such as by the use of magnets or by male/female threaded constructions.

The present invention provides an inexpensive and easy to utilize system for improving the camera capabilities of cellular telephones and the like.

BRIEF DESCRIPTION OF THE DRAWINGS

FIG. 6 is a right side elevation view of the cellular telephone case incorporating camera lens as illustrated in FIG. 1;

FIG. 7 is a left side elevation view of the cellular telephone case incorporating camera lens as illustrated in FIG. 1;

FIG. 8 is a top plan view of the cellular telephone case incorporating camera lens as illustrated in FIG. 1;

FIG. 9 is a bottom plan view of the cellular telephone case incorporating camera lens as illustrated in FIG. 1;

DETAILED DESCRIPTION OF THE DRAWINGS

Figure 1:
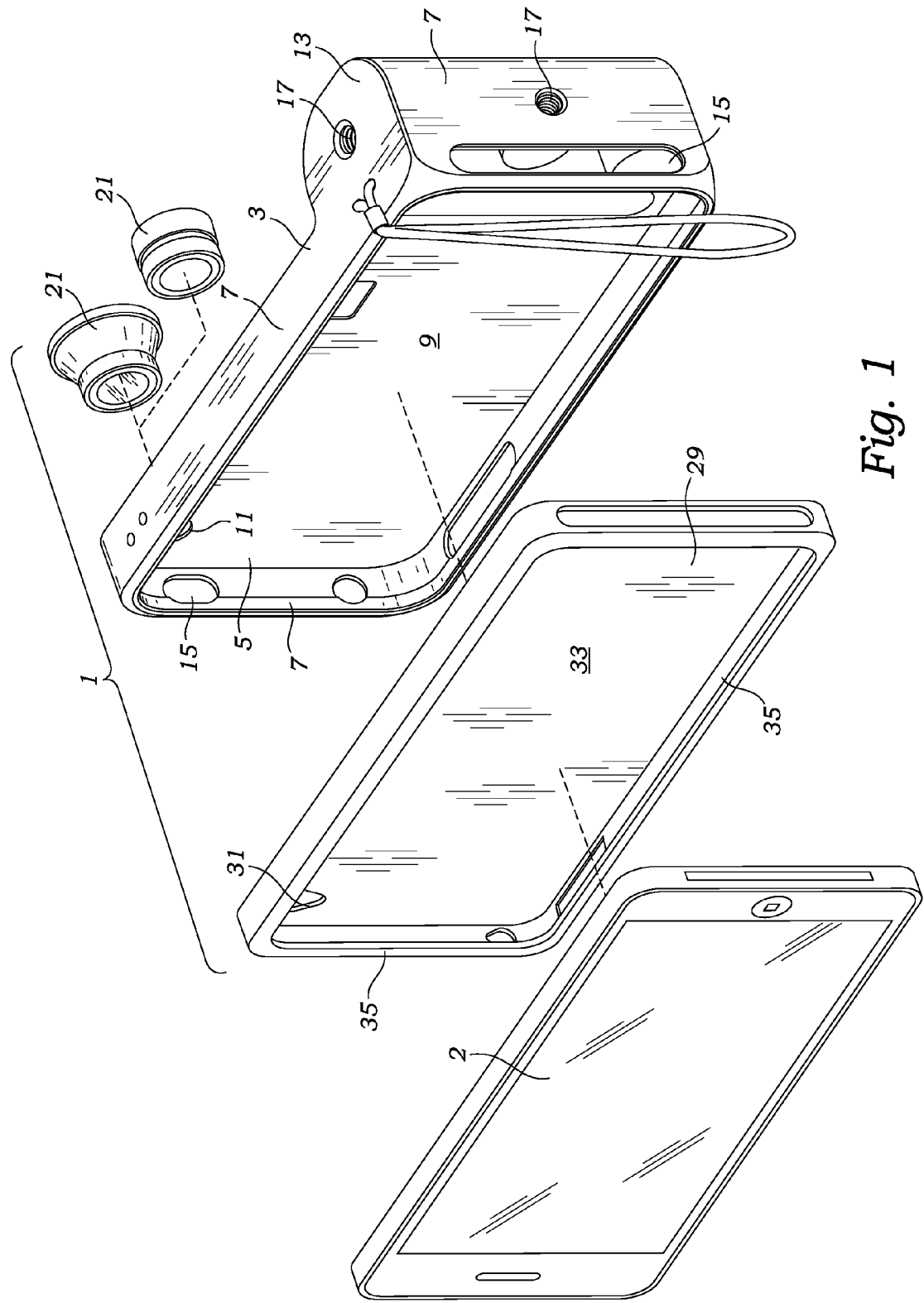
FIG. 1 is a perspective view of a first embodiment of the cellular telephone case incorporating camera lens.
Figure 10:
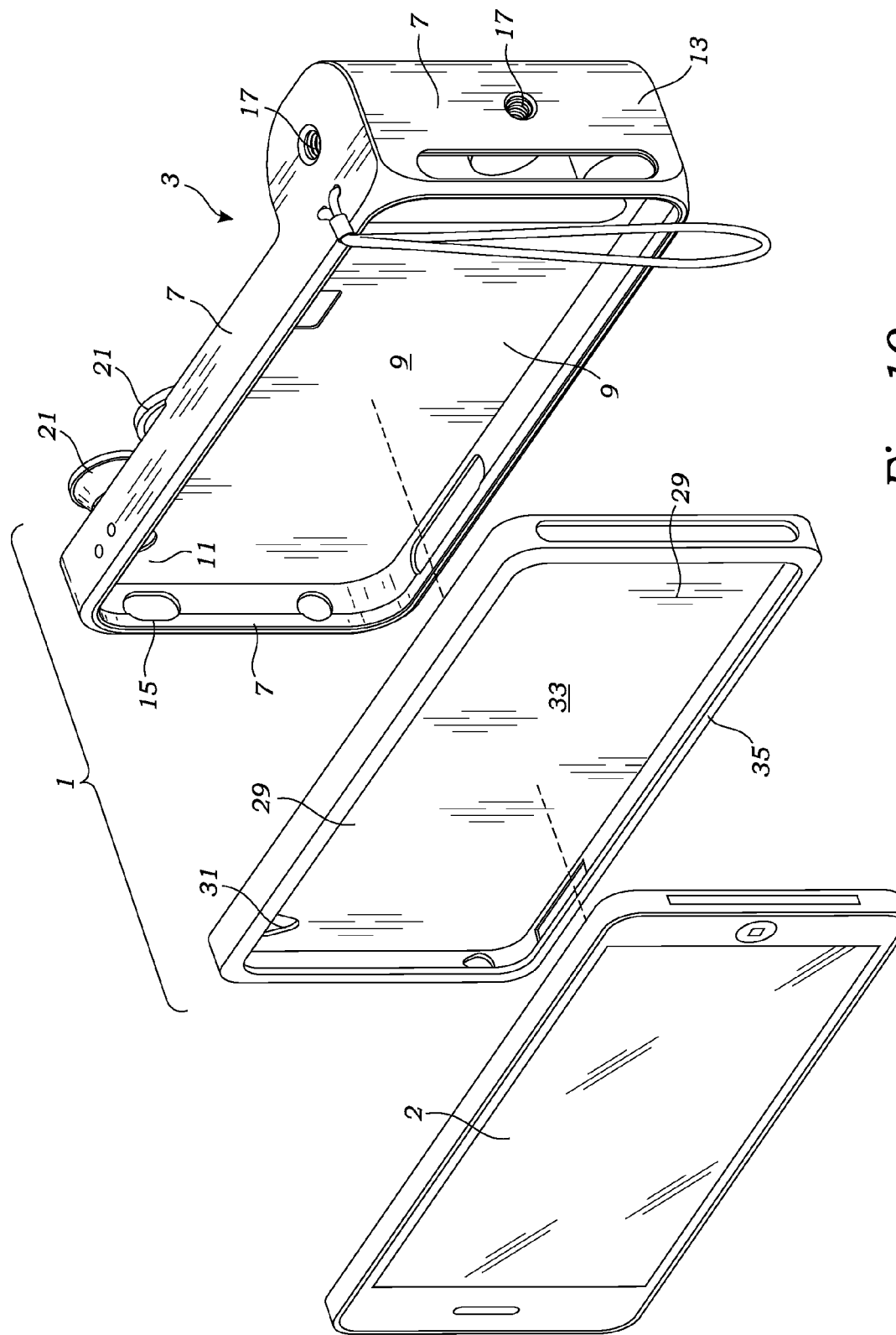
FIG. 10 is a perspective view of a second embodiment of a cellular telephone case incorporating rotating camera lens.
Figure 11:
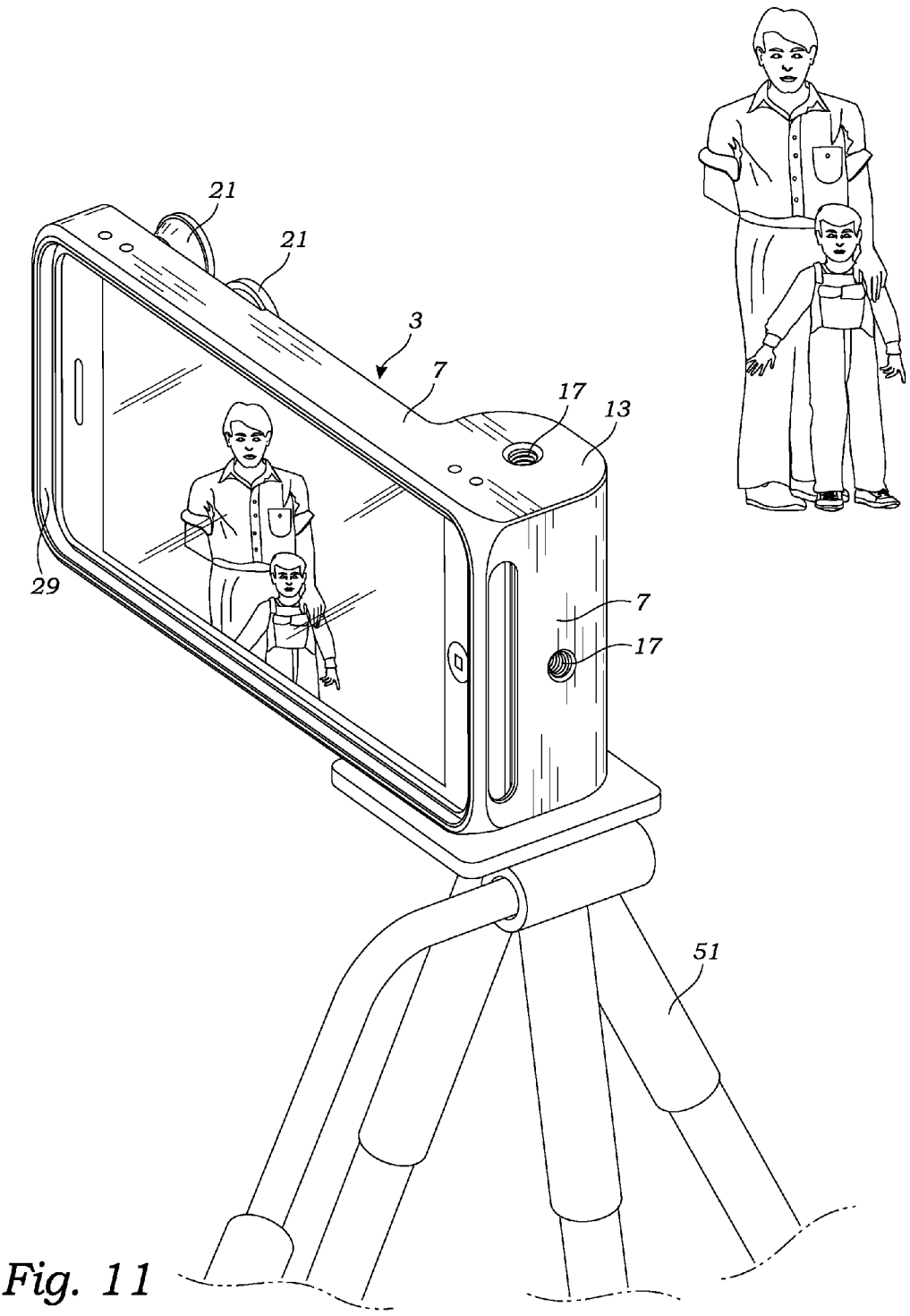
FIG. 11 is a perspective view of the cellular telephone case incorporating rotating camera lens as illustrated in FIG. 10 in use mounted to a tripod.
Figures 12, 13:
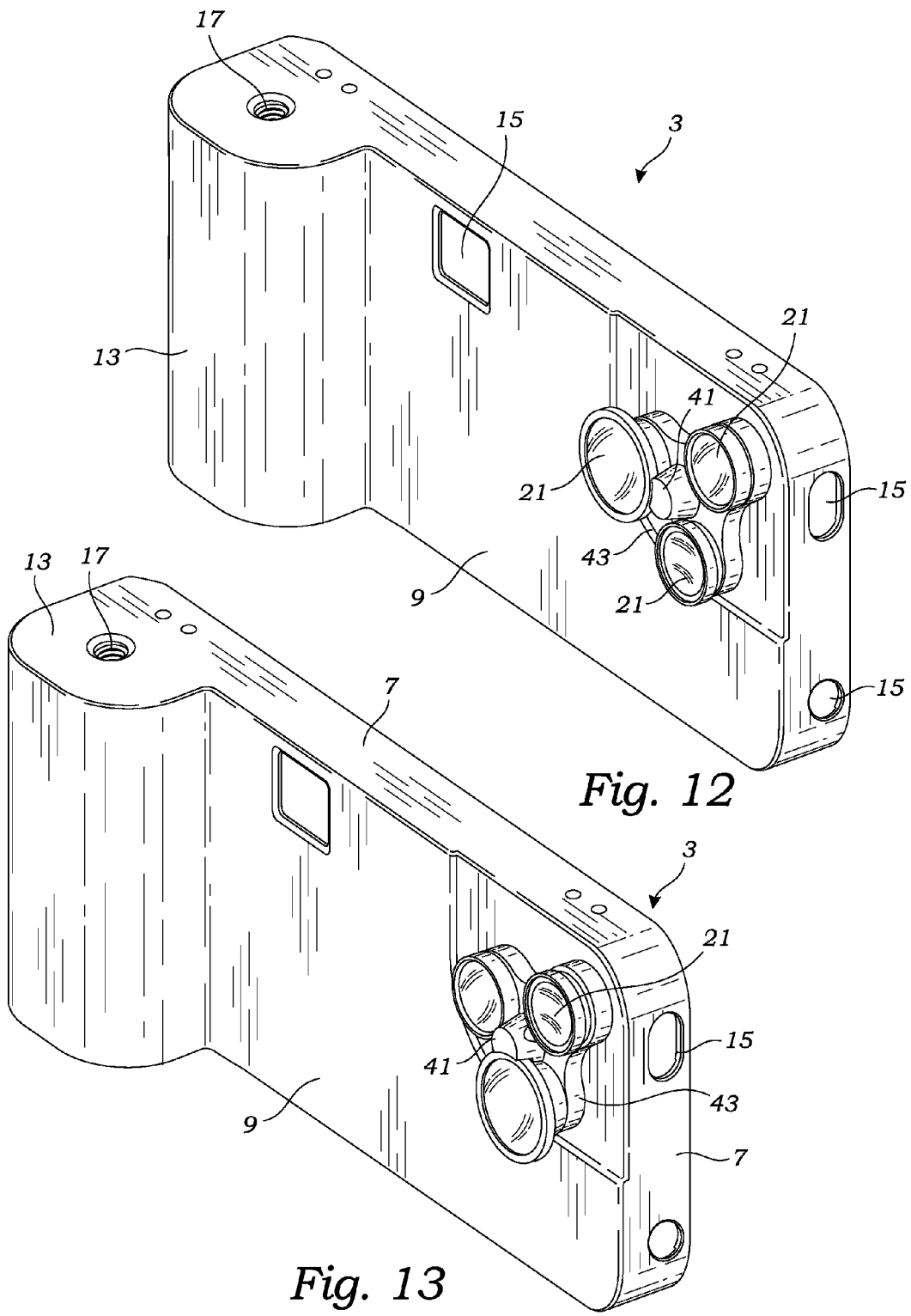
FIG. 12 is a front perspective view of the cellular telephone case incorporating rotating camera lens as illustrated in FIG. 10.
FIG. 13 is a front perspective view of the cellular telephone case incorporating rotating camera lens of FIG. 12 wherein the rotating lens has been rotated approximately 100°.
Figure 14:
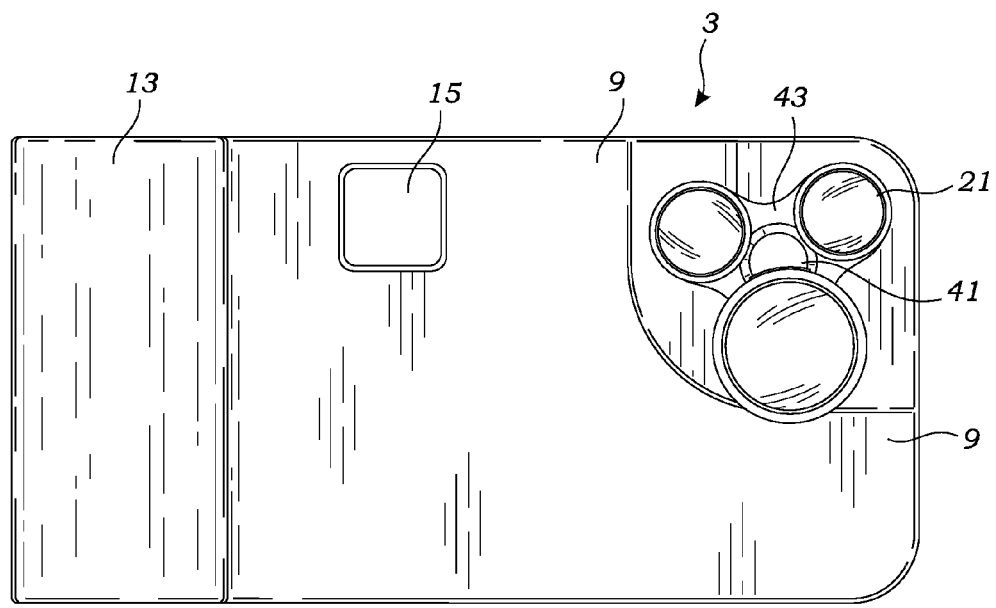
FIG. 14 is a front elevation view of the cellular telephone case incorporating rotating camera lens illustrated in FIG. 10.
Figure 15:
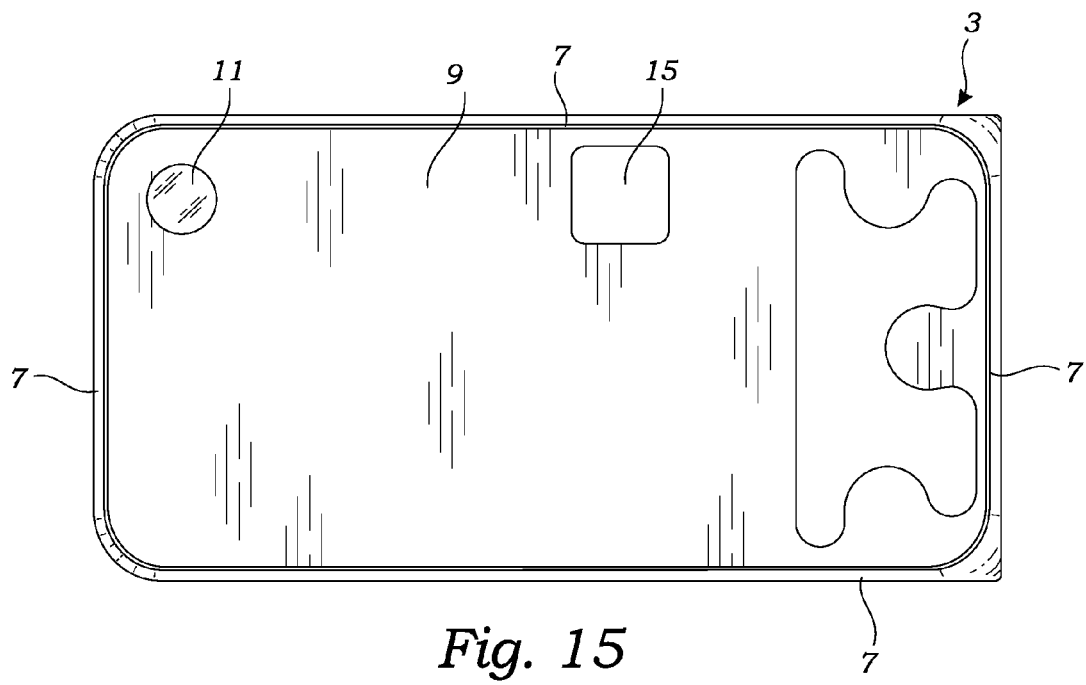
FIG. 15 is a rear elevation view of the cellular telephone case incorporating rotating camera lens illustrated in FIG. 10.
Figure 16:
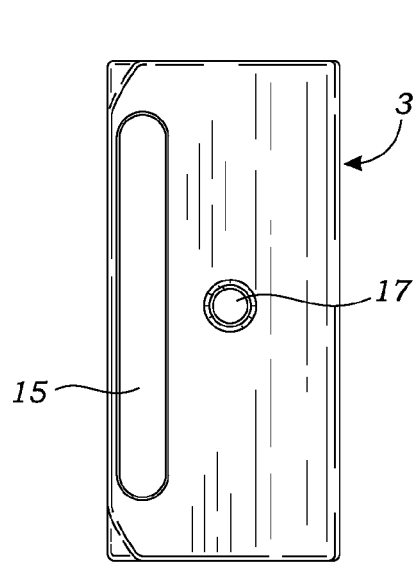
FIG. 16 is a right side elevation view of the cellular telephone case incorporating rotating camera lens illustrated in FIG. 10.
Figure 17:
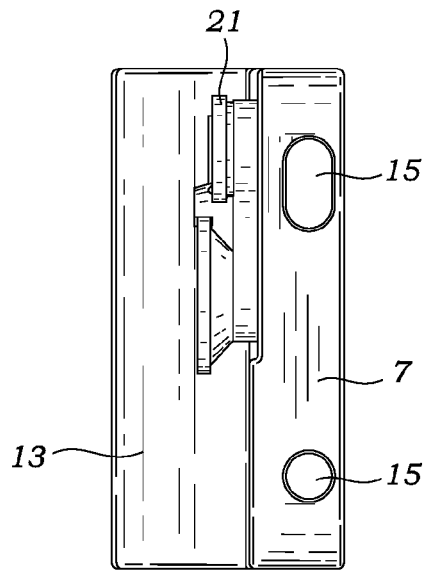
FIG. 17 is a left side elevation view of the cellular telephone case incorporating rotating camera lens illustrated in FIG. 10.
Figure 18:
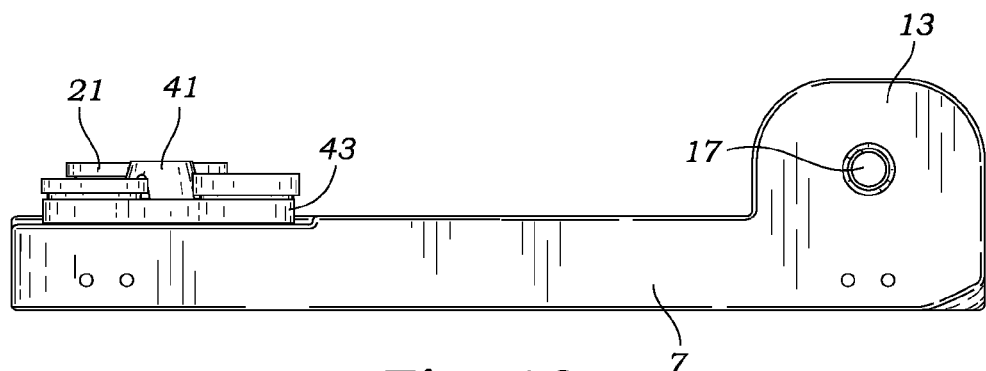
FIG. 18 is a top plan view of the cellular telephone case incorporating rotating camera lens illustrated in FIG. 10.
Figure 19:
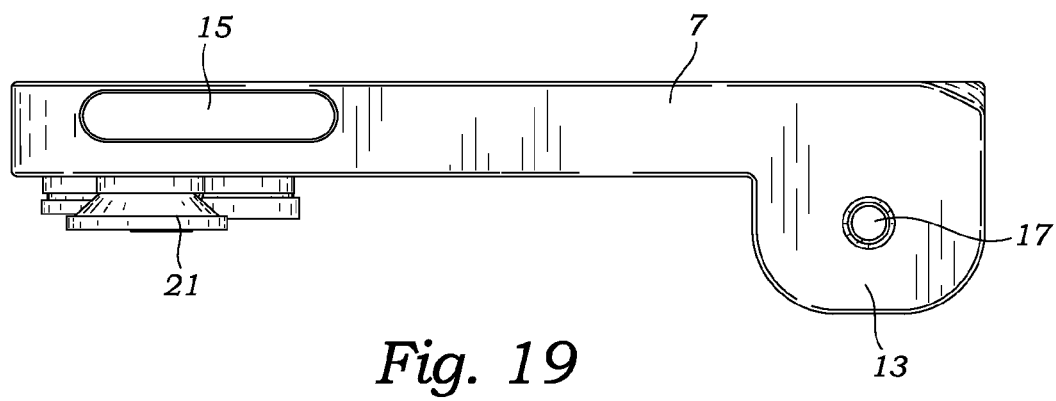
FIG. 19 is a bottom plan view of the cellular telephone case incorporating rotating camera lens illustrated in FIG. 10.

As illustrated in FIGS. 1-19, the cellular telephone case incorporating camera lens includes several improvements compared to previous cases. The camera enhanced case 1 of the present invention includes a housing 3. Preferably, the housing 3 is made of a substantially hard inflexible material for providing impact protection to a cellular telephone. Preferred materials include hard plastics and even more preferably metals such as ferrous steel, aluminum, or titanium. As illustrated in FIGS. 1 and 10, the housing 3 has a recess 5 formed by the housing's front wall 9 and sidewalls 7. The recess 5 is constructed for receiving and protecting a cellular telephone 2.

Figure 2:
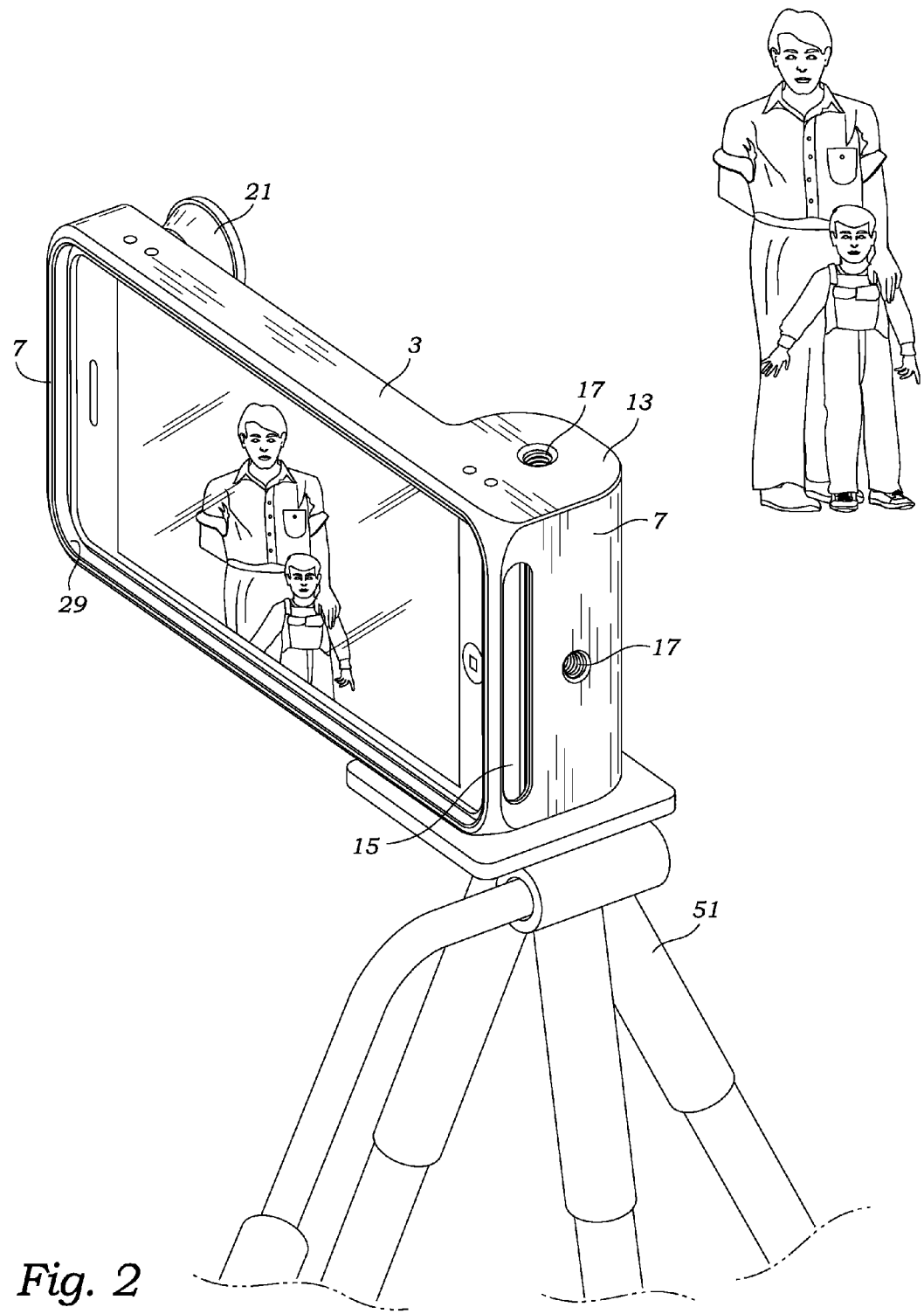
FIG. 2 is a perspective view of the cellular telephone case incorporating camera lens as illustrated in FIG. 1 in use mounted to a tripod.
Figure 3:
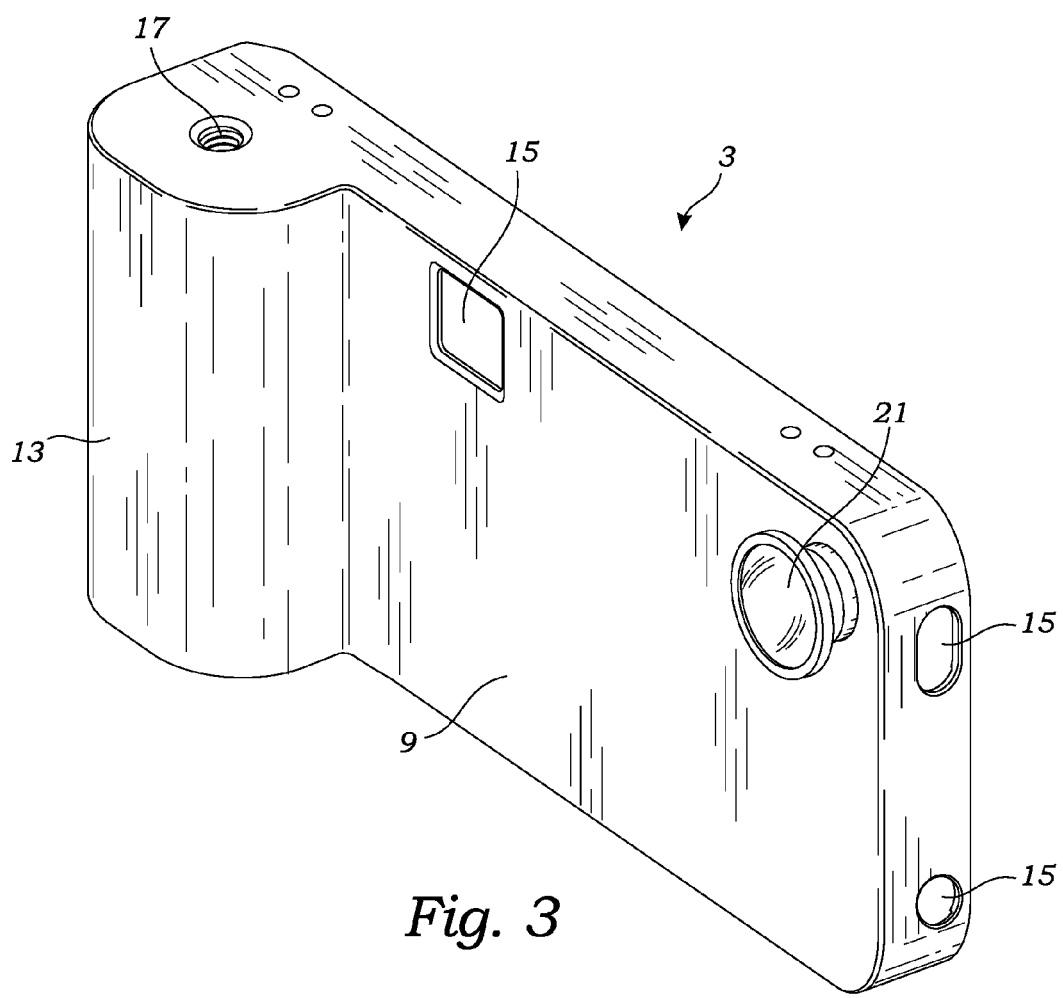
FIG. 3 is a front perspective view of the cellular telephone case incorporating camera lens as illustrated in FIG. 1.
Figure 4:
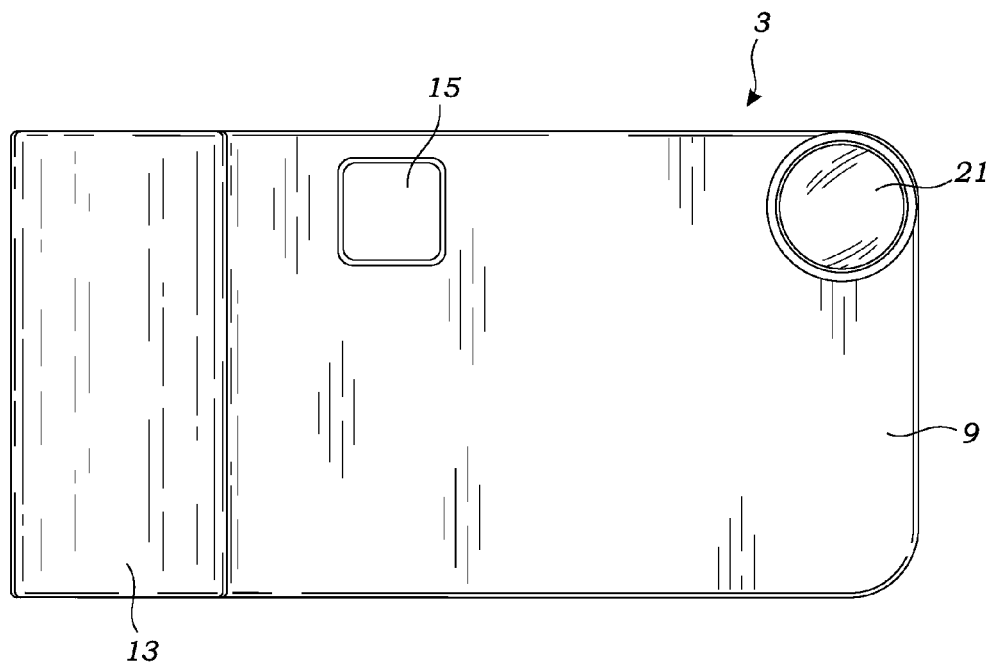
FIG. 4 is a front elevation view of the cellular telephone case incorporating camera lens as illustrated in FIG. 1.
Figure 5:
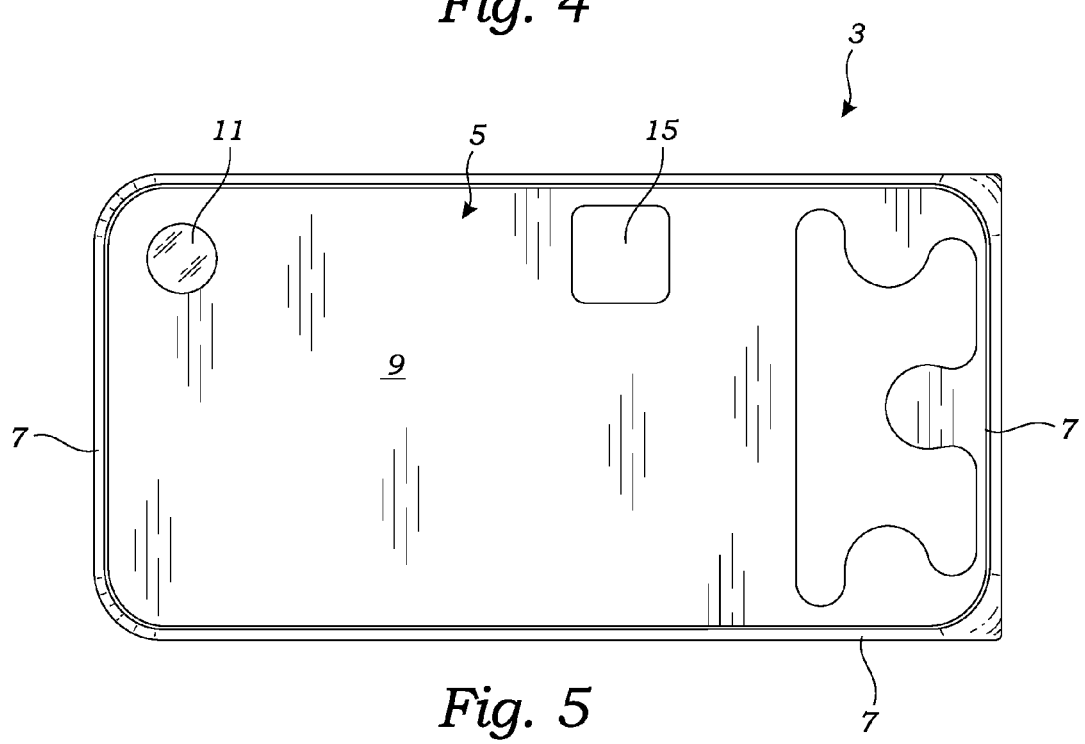
FIG. 5 is a rear elevation view of the cellular telephone case incorporating camera lens as illustrated in FIG. 1.

As illustrated in FIGS. 1-19, preferably the housing 3 also includes a region which projects forwardly from the housing's face plate which forms a handle for better controlling the manual manipulation of the camera enhancement case 1. As illustrated in the figures, this handle projection 13 preferably extends along the lengths of one side of the housing's face plate and is sized for being held by a human hand. As illustrated in FIG. 2, a preferred handle projection 13 extends forwardly from the right side of the housing's face plate. However, this handle projection 13 may extend forwardly along the left side of the housing's face plate, or may project forwardly from the top or bottom side of the housing's face plate. In addition, preferably the handle projection 13 has one, two or preferably three threaded bores 17. As illustrated, the handle projection has two bores 17 positioned at opposite ends of the handle projection 13 which face opposite of one another. Furthermore, the preferred handle projection 13 includes a third female threaded bore 17 which is located in the middle of the handle projection and is constructed to face at a 90° angle to the bores located at the handle projection's ends.

As illustrated in FIGS. 1, 5, 10 and 14, the housing's front wall 9 includes a hole 11 which is intended to be positioned in front of a camera lens of a cellular telephone after the cellular telephone has been inserted into the housing's recess 9. As would be understood by those skilled in the art, the cellular telephone's camera lens and housing's hole 11 are aligned so that the cellular telephone is capable of taking pictures while the cellular telephone and case are combined together. Preferably, the housing 3 also has additional holes or slots 15 formed into the housing's sidewall 9 and/or sidewalls 7 for accessing any buttons or electrical connectors such as a headphone jack or charging port positioned along the periphery or front of the cellular telephone.

As illustrated in FIGS. 1 and 10, very preferably the camera enhancement case 1 includes a sleeve 29. The sleeve 29 has a similar construction as the housing 3, and thus includes a front wall 33 and four sidewalls 35. The cellular telephone 2 is intended to reside within the sleeve 29, and in turn, the sleeve 29 is sized to reside in the housing's recess 9. The sleeve has a hole 31 positioned to align with the cellular telephone's camera lens and the housing's hole 11 so as to allow the cellular telephone's camera to still take pictures when positioned within the sleeve and housing. In addition, the sleeve has holes for aligning with the cellular telephone's buttons and/or electrical connectors such as a headphone jack or charging port. Preferably, the sleeve 29 is made of a soft malleable material. Preferred materials include natural and synthetic rubbers, and very soft plastics. Preferably, the housing 3 is made of a harder material than the sleeve 29.

The camera enhancement case 1 further includes one or more ancillary camera lenses 21 for supplementing the camera capabilities of the cellular telephone 2. As illustrated in FIGS. 1-9, in a first embodiment of the lens construction, a single replaceable camera lens 21 is affixed to the housing 3 by fasteners known to those skilled in the art. In a preferred embodiment, the lens 21 includes an annular magnet for engaging an annular recess formed in the housing around the housing's hole 11. The magnetic property of the lens' annular magnet affixes to the ferrous metal of the housing 3. Lenses can be easily installed or removed. As illustrated in FIGS. 6-8, the replaceable lenses may include traditional fish eye, wide angle and telephoto lenses.

Alternatively, the lenses may include other attachment constructions such as a male or female threaded member for mating to a cooperative female or male threaded structure formed around the housing's hole 11.

In a second embodiment of the camera enhancement case 1 of the present invention, FIGS. 10-19 illustrate the camera enhancement case including a rotating bracket assembly 43. The rotating bracket is affixed to the face plate by a spindle 41 or the like which allows the rotating bracket 43 to rotate freely. The rotating bracket may be freely removable from the housing's front wall, such as utilizing a threaded spindle. Alternatively, the rotating bracket may be affixed to the housing's front wall by use of a riveted spindle or the like. The rotating bracket holds two or more camera lenses 21. As illustrated in the figures, preferably the rotating bracket is constructed to hold three lenses 21. The rotating bracket is constructed to selectively position each of the lenses 21 in front of the camera hole 11. Rotation of the rotating bracket allows different lenses to be selectively positioned in front of the case's hole 11, which in turn is in front of the cellular telephone's camera lens.

While several particular forms of the invention have been illustrated and described, it will be apparent that various modifications can be made without departing from the spirit and scope of the invention.

Having identified the presently preferred best modes of practicing the invention, I claim:

1. A case and cellular telephone combination comprising:
   a cellular telephone having a front and sides, said cellular telephone incorporating a camera having a camera lens;
   a housing detachably affixing to said cellular telephone, the housing including a front wall and four sidewalls forming a recess detachably receiving said cellular telephone, said housing front wall and four sidewalls covering the front and sides of said cellular telephone, said housing front wall having a front side, a rear side and a hole positioned to be adjacent said cellular telephone's camera lens;

a bracket assembly rotatable affixed to said housing's front wall and front side;

two or more ancillary camera lenses mounted to the bracket assembly, said two or more ancillary camera lenses mounted to said bracket assembly such that rotation of said bracket assembly causes said one of said ancillary camera lenses to selectively cover said housing's hole and selectively align one of said ancillary camera lenses with said cellular telephone's camera lens.

2. The case and cellular telephone combination of claim 1 further comprising:

a sleeve for engaging and detachably affixing to said cellular telephone, the sleeve including a front wall and four sidewalls for covering the front and sides of said cellular telephone, said sleeve having a hole positioned to be adjacent said cellular telephone's camera lens;

said sleeve sized for detachable residing within said housing wherein said sleeve hole is adjacent to said housing hole, and said housing is made of a substantially hard inflexible material and said sleeve is made of a substantially flexible material.

3. The case and cellular telephone combination of claim 1 wherein said housing further comprises a handle projection which projects forwardly from said front wall's front side, said handle projection extending substantially along the length of one edge of said front side and said handle projection forming a handle sized for being held by a human hand.

4. The case and cellular telephone combination of claim 3 further comprising one or more female threaded bores formed into said handle projection, said female bores sized and positioned for receipt of a male threaded member of a tripod mount.

5. The case and cellular telephone combination of claim 4 wherein said one or more female threaded bores include two bores positioned at opposite ends of said handle projection.

6. The case and cellular telephone combination of claim 4 wherein said one or more female threaded bores include two bores including a first bore positioned at one end of said handle projection and a second bore located about midway along the length of said handle projection, said first bore aligned approximately 90° to said second bore.

* * * * *